2,867,675

Patented Jan. 6, 1959

2,867,675

PROCESS FOR THE POLYMERIZATION OF MONO-OLEFIN AND ACETYLENE HYDROCARBONS

Isadore Shapiro, Pasadena, and Harold G. Weiss, Duarte, Calif., assignors, by mesne assignments, to Olin Mathieson Chemical Corporation, a corporation of Virginia No Drawing. Application December 1, 1955
Serial No. 550,512

2 Claims. (Cl. 260—673)

Our invention relates to a process for the polymerization of mono-olefin and acetylene hydrocarbons having from two to four carbon atoms by contacting such hydrocarbons with particular surface modified oxides of the gel type in which the bound water of the oxides has been reacted with diborane.

Application Serial No. 407,147, filed January 29, 1954, of Isadore Shapiro, now Patent No. 2,829,981, issued April 8, 1958, describes surface modified oxides of the gel type and processes for their preparation by treating the gel to remove all adsorbed water and thereafter contacting the gel containing only bound water with diborane to replace hydrogen atoms of hydroxyl groups of the original gel structure by —$BH_2$ radicals. Unlike the adsorbed water of gels, the bound water is chemically combined water and constitutes an integral part of the gel framework. The adsorbed water may be removed from the gel to leave only bound water in the gel by any suitable treatment, for example, by heating, by evacuating, or by desiccating with a suitable desiccant such as $P_2O_5$. This bound water is present in the gel in the form of hydroxyl ions, the bulk of which are located in the surface of the gel. The hydroxyl ions serve partially to hydrolyze borine ($BH_3$) formed by the dissociation of diborane when diborane is brought into contact with a gel containing only bound water. As the result of this hydrolysis reaction, new gel products are formed containing chemically bound boron in the form of partially hydrolyzed borine. The hydrolysis of the borine can be completed by heating or exposing such a product to an excess of free water to convert at least a portion of the —$BH_2$ radicals to

—$B(OH)_2$ radicals, and heating the surface modified oxide to about 500° C. to 1,000° C. to effect dehydration by removing hydrogen atoms and hydroxyl radicals as water.

We have now found that these surface modified oxides of the gel type demonstrate unusal ability to polymerize mono-olefin and acetylene hydrocarbons having from two to four carbon atoms at temperatures substantially lower than those ordinarily employed in the catalytic processing of hydrocarbons. For example, there is no indication of a reaction having taken place when acetylene is contacted with a commercial silica-alumina cracking catalyst at room temperature even for several hours, while we have produced measurable amounts of benzene when acetylene was contacted at room temperature for only a few minutes with a sample of the same commercial silica-alumina cracking catalyst previously treated with diborane to produce a surface modified product.

Thus according to our invention, mono-olefin hydrocarbons such as for example, ethylene, propylene and isobutylene, and acetylene hydrocarbons such as for example, acetylene and methyl acetylene, are polymerized by contact at a temperature of about 10° C. to 150° C. with a surface modified oxide of the gel type wherein hydrogen atoms of hydroxyl groups of the original gel structure have been replaced by —$BH_2$ radicals and/or —$B(OH)_2$ radicals.

The surface modified oxides employed in our invention can be prepared from any of many various gel materials which contain chemically combined or bound water which exists in the form of hydroxyl ions the majority of which are present in the surface of the gel material. Synthetic silica, alumina and magnesia gels, or gels prepared from any combination of these, for example, silica alumina, alumina-magnesia or silica-alumina-mgnesia gels, as well as natural clays, can be so modified.

In preparing the surface modified oxides of the gel type, any adsorbed water present in the gel to be modified is first removed by suitable treatment, such as, by heating, by evacuating, by desiccating with $P_2O_5$, or by a suitable combination of these separate methods of treatment. Temperatures of 100° to 150° C. may be employed to remove the adsorbed water and 10 to 15 minutes at a temperature within this range should be sufficient to remove all adsorbed water. A temperature of 150° C. and a heating time of 10 to 15 minutes in vacuo will ensure that all adsorbed water has been completely removed from any gel.

When employing heating to remove adsorbed water from the gel, the use of temperatures higher than 150° C. will result in driving off some of the bound water. If it is desired to reduce the hydroxyl ion content of the gel and thereby the ultimate content of chemically bound boron in the final surface modified product, temperatures above 150° C. may be employed in this preliminary treatment of the gel. All of the bound water of a gel will not be driven off until very high temperatures are reached, i. e., temperatures of the order of about 1050° C.

Table I shows the percent of bound water in a silica gel which was thermally aged at the various temperatures indicated and also shows the percent of the total contained hydroxyl ion that is present in the surface of the gel as determined by the hydrogen evolved when the gel was exposed to diborane gas to the point of saturation. The heating periods for the several temperatures were approximately 4 to 7 hours to insure equilibrium conditions. Shorter times probably would have been sufficient to achieve the indicated percent of bound water for each particular temperature.

TABLE I

| Aging Temp., °C. | Percent $H_2O$ by thermal analysis (dry basis) | Wt. sample (dry basis), g. | Cc.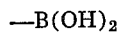$H_2$ calcd. as OH content (X) | Cc.ⁿ$H_2$ from $B_2H_6$ exposure (y) | Percent OH in surface y/x |
|---|---|---|---|---|---|
| 115 | 4.92 | 0.3686 | 45.14 | 32.92 | 73.0 |
| 370 | 2.24 | .5308 | 29.59 | 25.49 | 86.1 |
| 500 | 1.31 | .5773 | 18.82 | 18.18 | 96.6 |
| 750 | 0.3 | .4607 | 3.44 | 3.42 | 99+ |

ᵃ At 0° and 760 mm.

As is evident from the above table, it is possible to control the amount of hydroxyl ions present in the surface of the gel to be modified by subsequent treatment with diborane by varying the heating temperature in the preliminary treatment of the gel. By this means it is possible to control the amount of boron, in the form of partially hydrolyzed borine, that will be chemically combined with the gel through the hydrolysis reaction between borine and hydroxyl ions. Therefore, it is possible to control the amount of chemically combined boron that will be present in a final modified product in which all the hydroxyl ions have entered into reaction with the borine supplied by the diborane.

After the preliminary treatment of the gel to remove at least all the adsorbed water has been completed, the gel now containing only bound water is exposed to diborane gas. It should be noted by way of precaution that since diborane is highly reactive with air or water, all handling of diborane should be carried out in high vacuum apparatus or at least under conditions excluding both air and water. The treatment of the gel with diborane may be carried out over a wide range of temperatures. The diborane dissociates the borine and the borine reacts with the hydroxyl group of the bound water of the gel and becomes partially hydrolyzed. The hydrolysis of the partially hydrolyzed borine may be completed by contact with an excess of water vapor.

It has been established that varying the grain size of a particular gel does not alter the specific surface, porosity, or water content of the gel. Therefore, the process is applicable to gels in whatever particle size they may be used. The actual amount of bound water in a particular gel will depend on the method of preparation of the original gel plus the method used in the preliminary treatment of the gel to remove adsorbed water prior to the exposure of the gel to diborane.

The process to produce the surface modified oxides or gels may be illustrated as follows: The recognized structural formula for silica containing only bound water is:

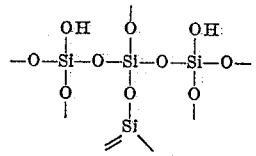

The reaction of this silica with diborane is as follows:

(A)

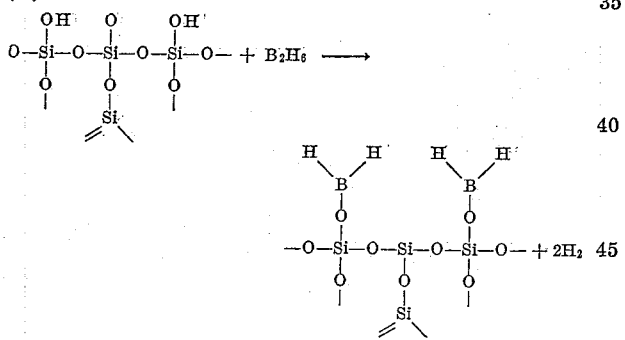

The reaction of the partially hydrolyzed borine ions with water is as follows:

(B)

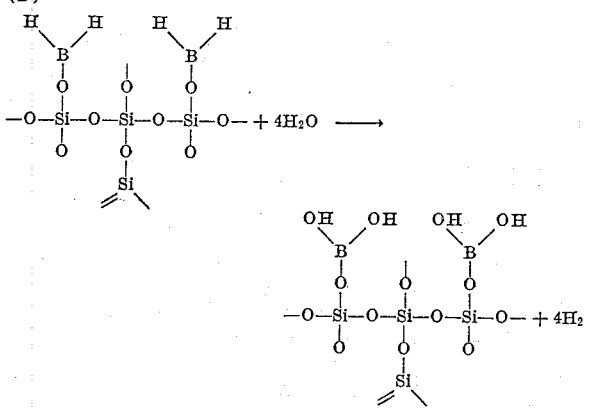

The validity of these reactions can be established by measuring the relative ratios of bound water, diborane, and hydrogen involved. In the presence of free water it is well recognized that the following reaction occurs:

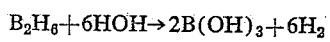

This reaction indicates a ratio of 6 molecules of hydrogen evolved per molecule of diborane consumed. There is also a ratio of 6 molecules of water to each molecule of diborane. In conducting a reaction according to Equation A, it was found that the actual ratio of hydrogen to diborane was approximately 2 indicating that only 2 of the 6 hydrogen atoms of the diborane were consumed. In a specific reaction conducted according to Equation A, 0.5773 gram of a silica gel (dry basis) containing 1.31% bound water (by thermal analysis) was exposed to an excess of diborane gas and therefore should have yielded 18.82 cc. of hydrogen according to Equation A. Actually, 18.18 cc. of hydrogen were evolved. When this product of Equation A was exposed to an excess of water vapor, additional hydrogen was evolved in accordance with Equation B. The total amount of hydrogen evolved from the reactions according to Equations A and B brought the ratio of total hydrogen to diborane from these two reactions to 6:1 thus indicating that the remaining 4 hydrogens of the diborane were hydrolyzed in accordance with Equation B to give the products of that equation.

The following examples illustrate the preparation of the surface modified products and the use of such products in accordance with the process of our invention:

*Example I*

A sample of a commercial one-eighth inch pellet size synthetic silica-alumina cracking catalyst of about 10–15 percent by weight alumina is heated at 275° C. in vacuo for several hours in order to remove adsorbed water. Approximately 30 to 40 cc. bulk volume of the dried catalyst is placed in a closed circulating system of 2 liter capacity, and 70 cc. (STP) of diborane, which previously has been purified by low temperature fractionation, are introduced into the system. Diborane is circulated through the catalyst bed at room temperature for 2 to 3 hours, after which the diborane is condensed in a trap cooled with liquid nitrogen and the hydrogen is pumped from the system. Exposure of the catalyst to the diborane with subsequent removal of the hydrogen is repeated several times. A pronounced decrease in the amount of hydrogen generated indicates saturation of the catalyst with diborane. After this treatment the entire system is evacuated to remove any adsorbed diborane. The color of the modified catalyst is white.

*Example II*

Approximately 370 cc. (STP) of acetylene are circulated at room temperature through the modified silica-alumina catalyst mass prepared according to Example I. Immediately upon exposure of the catalyst to acetylene, the catalyst becomes discolored and appears purple. The discoloration of the catalyst is believed to be due to the formation of an intermediate product, thus indicating that a reaction has occurred. After a few minutes of exposure time, the gaseous mixture is fractionated through a −125° C. bath. Approximately 17 cc. of material are retained in the −125° C. It has a vapor pressure of 65 mm. at 17° C. and mass spectral analysis indicates the product to be benzene. Less than 240 cc. (STP) of acetylene are recovered.

*Example III*

Approximately 240 cc. (STP) of acetylene are circulated through the surface modified catalyst mass of Example I with the catalyst heated to 90–110° C. After a few minutes of exposure time, the gaseous mixture is fractionated through a −125° C. bath and 20 cc. of material are retained in the −125° C. fractionation. This fraction has a vapor pressure of 65 mm. at 17° C. and mass spectral analysis indicates the product to be benzene.

*Example IV*

Approximately 370 cc. (STP) of methyl acetylene are circulated at room temperature through the surface modified catalyst mass of Example I. After circulation for 75 minutes, the reaction products are fractionated through a —80° C. bath, 0.2 cc. of material are retained in the —80° C. fraction which upon mass spectral analysis is found to contain trimethyl benzene.

*Example V*

Approximately 260 cc. (STP) of ethylene are circulated through the surface modified catalyst mass of Example I at room temperature for 70 minutes. Trace quantities of hexane and/or cyclohexane were observed in the mass spectrum.

*Example VI*

A sample of commercial synthetic hard alumina catalyst, is heated in vacuo at 400° C. for 5 hours prior to exposure to diborane. The catalyst is treated with diborane at temperatures varying from 60° C. to 100° C. in equipment similar to that used for the treatment of the silica-alumina catalyst in Example I.

*Example VII*

Approximately 105 cc. (STP) of acetylene are circulated through the surface modified alumina catalyst of Example VI at room temperature for 95 minutes. Discoloration of the catalyst is noticed in 2 minutes exposure time. Mass spectral analysis of the gaseous material shows benzene to be present in addition to unused acetylene.

We claim:

1. Process for the polymerization of mono-olefin and acetylene hydrocarbons having from two to four carbon atoms which comprises contacting such hydrocarbons at a temperature of about 10° C. to 150° C. with a surface modified oxide of the class consisting of at least one of silica, alumina, and magnesia gels containing chemically combined boron in the surface structure of the gel, wherein hydrogen atoms of hydroxyl groups of the original gel structure have been replaced by —$BX_2$ radicals in which X is selected from the group consisting of hydrogen atoms and hydroxyl radicals.

2. Process for the cyclization of acetylene hydrocarbons having from two to four carbon atoms which comprises contacting such hydrocarbons at a temperature of about 10° C. to 150° C. with a surface modified oxide of the class consisting of at least one of silica, alumina, and magnesia gels containing chemically combined boron in the surface structure of the gel wherein hydrogen atoms of hydroxyl groups of the original gel structure have been replaced by —$BX_2$ radicals in which X is selected from the group consisting of hydrogen atoms and hydroxyl radicals.

References Cited in the file of this patent

UNITED STATES PATENTS

| | | |
|---|---|---|
| 2,129,649 | Cross et al. | Sept. 13, 1938 |
| 2,349,904 | Hachmuth | May 30, 1944 |
| 2,377,759 | Coupard | June 5, 1945 |
| 2,728,758 | Field et al. | Dec. 27, 1955 |
| 2,728,805 | Bohlbro | Dec. 27, 1955 |